E. M. SHANNON.
EQUALIZING GEAR FOR LOCOMOTIVES.
APPLICATION FILED MAR. 8, 1922.
1,422,793.
Patented July 11, 1922.
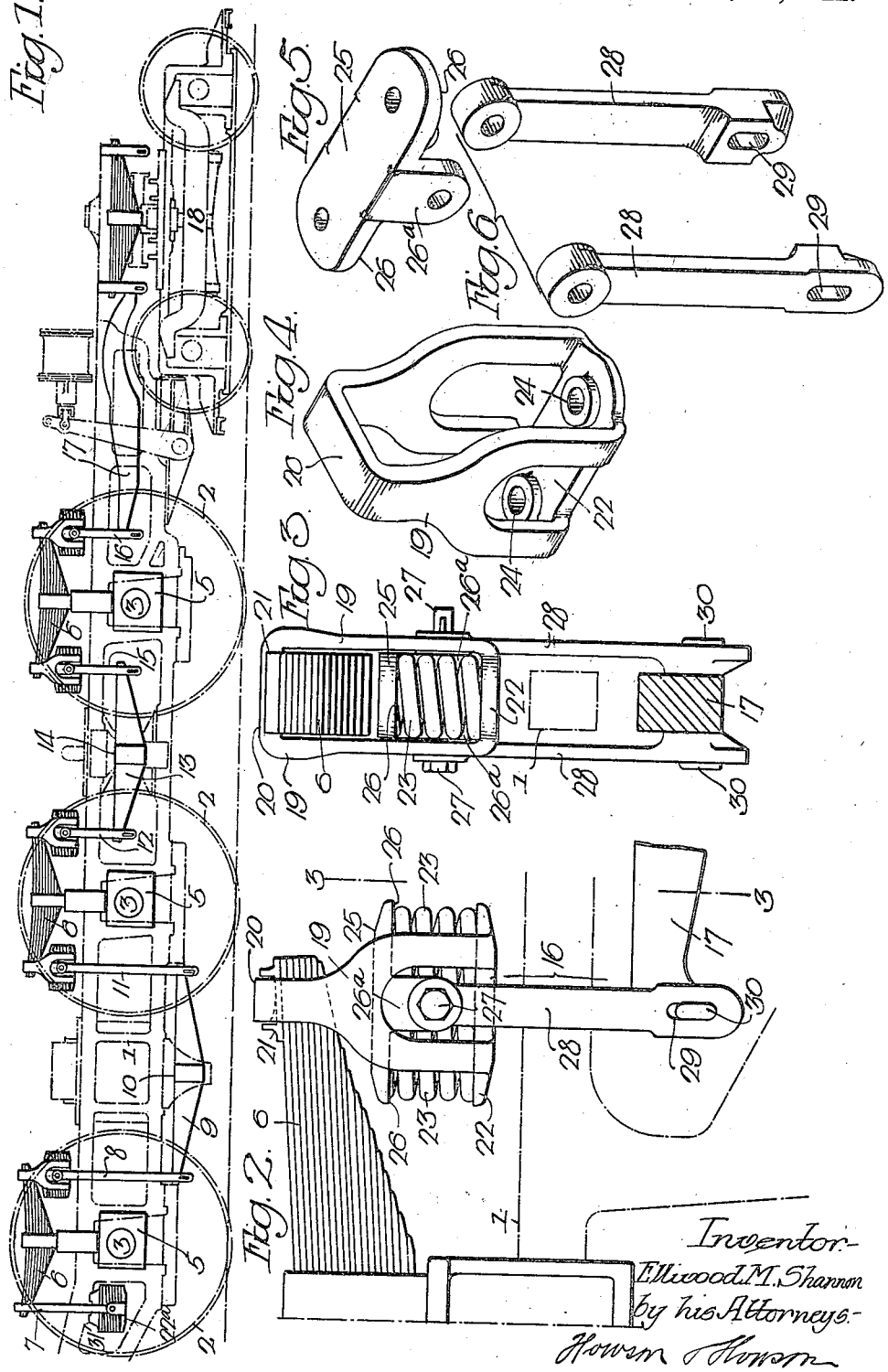

UNITED STATES PATENT OFFICE.

ELLWOOD M. SHANNON, OF BALA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

EQUALIZING GEAR FOR LOCOMOTIVES.

1,422,793.   Specification of Letters Patent.   Patented July 11, 1922.

Application filed March 3, 1922. Serial No. 542,057.

*To all whom it may concern:*

Be it known that I, ELLWOOD M. SHANNON, a citizen of the United States, residing in Bala, Montgomery County, Pennsylvania, have invented certain Improvements in Equalizing Gears for Locomotives, of which the following is a specification.

My invention relates to certain improvements in equalizing gears for locomotives. These equalizing gears consist of a series of springs and levers connected by links.

One object of my present invention is to provide flexible links for the equalizing gears so that there will be a certain amount of flexibility in each link.

A further object of the invention is to locate the springs of the links so that a spring will be located on each side of the pivot connecting the sections of the links.

The invention also relates to certain details of construction which will be described hereinafter.

In the accompanying drawings:

Fig. 1 is a diagrammatic side view of a locomotive showing one form of equalizing gear in full lines;

Fig. 2 is an enlarged side view of one of the links;

Fig. 3 is a sectional view on the line 3—3, Fig. 2; and

Figs. 4, 5 and 6 are views illustrating parts of the link.

Referring to the drawings, 1 is the frame of a locomotive. 2 are the wheels. 3 are the axles mounted in boxes 5 located in the frame of the locomotive. 6 are springs, which rest upon the boxes 5. 7 is a link connecting one end of the forward spring with the frame. 8 is a link connecting the other end of the forward spring with a lever 9 pivoted at 10. 11 is a link connecting the other arm of said lever with the forward end of the second spring 6. 12 is a short link connecting the opposite end of said spring with one arm of a lever 13, pivoted at 14, to the frame. 15 is another link connected to the third spring 6. 16 is a link connecting the opposite end of the last mentioned spring with the lever 17, which extends to the ordinary spring mechanism above the truck 18.

It will be understood that the number and arrangement of the members of the equalizing gear may be modified according to the type of locomotive to which the gear is applied.

Referring particularly to Figs. 2 and 3 of the drawings, 6 is one of the springs and one end of the lever 17 is shown. The link 16 is illustrated in the present instance. This link consists of a stirrup member 19, which is shaped as shown in Fig. 4, and has a cross member 20 resting on a gib 21 at the end of the spring 6. The under side of this member is slightly curved so that the stirrup will accommodate itself to the movement of the lever 17. The stirrup 19 has a spring seat 22 on each side of the center on which are mounted two coiled springs 23. Projections 24 on the spring seats center the springs.

25 is a plate having two spring seats 26, which rest upon the springs 23. At each side of the plate 25 are perforated lugs 26$^a$. The lugs extend to a point about midway between the spring seat and the spring plate. Connected to these lugs by pins 27 are link members 28. These link members are slotted at 29 for the cross bar 30, which extends under the end of the lever 17.

It will be seen by this construction that the link will yield under certain conditions and will accommodate itself to any movement of the two parts to which it is connected.

By extending the lugs 26$^a$ to a point about midway between the two spring plates, the springs will tend to keep the link in proper alignment, but will allow the springs to yield freely under lateral movement.

In Fig. 1 of the drawings, a spring is shown located between a spring plate 22$^a$ and an abutment plate 31 on the frame. The link 7, in this case, is continuous.

I claim:

1. The combination in an equalizing gear for locomotives, of a series of springs and levers; links connecting the ends of the levers with the ends of the springs, each connecting link being made in two parts pivotally connected; and two coiled springs between the parts of each link.

2. The combination in an equalizing gear for locomotives, of a series of springs and levers and connecting links, said links being made in two parts pivotally connected; and springs between the two parts, one on each side of the pivot.

3. The combination of a link for an equalizing gear consisting of a stirrup having a spring seat; springs mounted on the spring seat; a plate extending over the springs; and link members connected to the plate.

4. A link for an equalizing gear consisting of a stirrup having a cross member arranged to extend over a gib of a spring, the lower portion of the stirrup having a spring seat; two coiled springs mounted on the spring seat; an upper plate having a spring seat resting upon the two springs and within the stirrup; lugs projecting from the plate; and link members pivotally connected to the lugs.

5. The combination in a link for an equalizing gear, of a stirrup having a cross member arranged to be suspended from one of the elements of the equalizing gear and having a spring seat at its lower end; two coiled springs mounted on the spring seat; a spring plate resting on the springs within the stirrup; depending lugs extending to a point about midway between the spring plate and the spring seat; and link members pivotally connected to the lugs.

ELLWOOD M. SHANNON.